Nov. 9, 1965 J. H. INGMANSON 3,217,245
METHOD OF TESTING A PACKAGED INSULATED CABLE WOUND ON AN ANNULAR CORE
Filed March 27, 1962
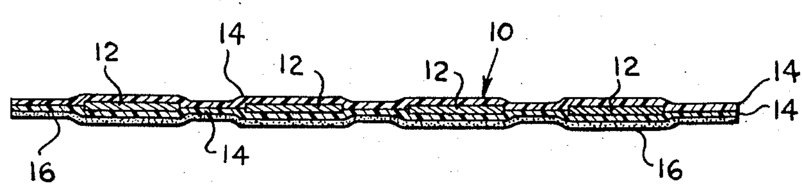
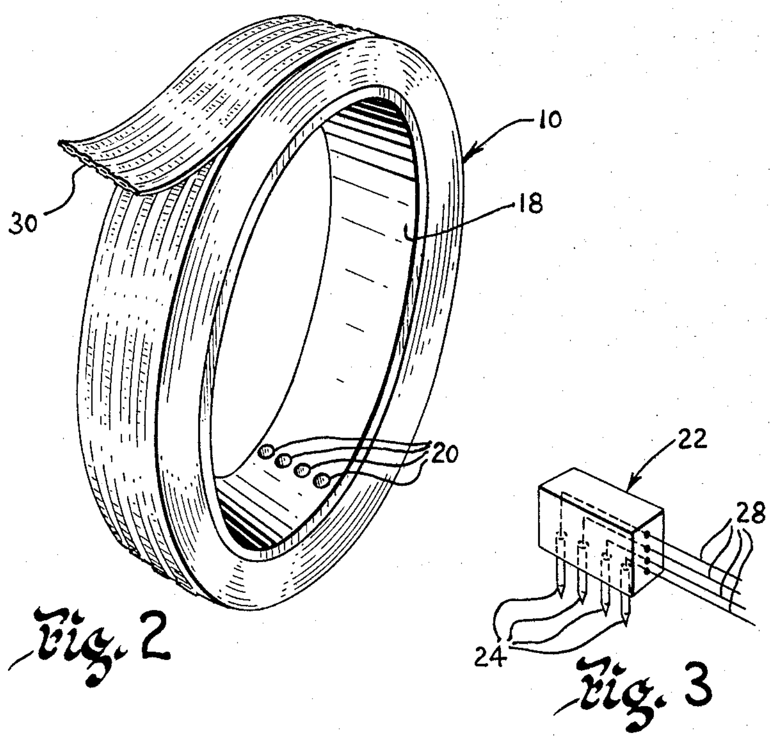
INVENTOR.
JOHN H. INGMANSON
BY
Steward & Steward
his ATTORNEYS

3,217,245
METHOD OF TESTING A PACKAGED INSULATED CABLE WOUND ON AN ANNULAR CORE

John H. Ingmanson, New Haven, Conn., assignor to The Whitney Blake Company, Hamden, Conn., a corporation of Connecticut Filed Mar. 27, 1962, Ser. No. 182,741
1 Claim. (Cl. 324—51)

The invention relates broadly to electrical cable and, more specifically to improvements in the packaging and testing of eelctrical cable wound in multiple layers upon a spool or core. In its broadest aspects the invention relates to electrical cable of all types but it has special relation to electrical cable in which there are a plurality of conductors disposed parallel to each other throughout the cable. Flat conductor flexible cables of the type first used in connection with missile applications and now used in a host of applications, including inside telephone wiring, are an example of the type of electrical cable for which the invention is particularly advantageous.

In the packaging of insulated electrical cable, the cable is frequently wound in layers upon a spool or core. Unless some special provision is made, the starting end of the cable is covered over by succeeding layers of cable so that the inner end of the cable is not accessible when the package is completed. This means that the purchaser of the packaged cable is unable to test the wound cable for continuity or any other property which requires the passage of an electric current through the cable since no connections can be made with the inner end. The problem is particularly acute in cases where a plurality of conductors are carried by the cable.

Accordingly, the invention has for its object the development of a method for testing rolls of electrical cable having one or more conductors without in any way modifying the usual wrapping procedure in which the inner end of the cable is buried beneath succeeding layers of cable. Another object of the invention is the development of an improved package of wound electrical cable which can be wound in the customary way yet will permit the continuity, and other characteristics of the conductors in the cable, to be tested without undoing the package.

For the purpose of illustrating one manner in which the invention may be made and practiced a presently preferred embodiment is shown in the accompanying drawings and this preferred embodiment will be described in detail hereinafter. It is to be understood, however, that the drawings and description are by way of example only and are not intended to define or limit the scope of the invention; the claim appended hereto, and their lawful equivalents, being relied upon for that purpose.

Of the drawings:

FIG. 1 is a cross sectional view of a flat-conductor flexible electrical cable having four conductors, FIG. 2 is a perspective view of a roll of the cable shown in FIG. 1, and FIG. 3 is a view of a probe which might be used to contact the conductors at the inner end of the cable.

To illustrate the invention there is shown in the drawings a roll of flat-conductor flexible electrical cable 10. This type of cable has in recent years come into wide use. It was first used in the missile field but has now been used in many other applications as well. Recently it has been used for inside telephone wire in apartments and other dwellings where there are no wooden moldings to which the telephone cable can be secured.

The cable used for this latter application customarily comprises a flat ribbon in which a plurality of flat copper conductors 12, 12 are disposed parallel to each other and sandwiched between two fused layers of plastic insulation 14, 14, usually a polyester film such as that sold by DuPont under the trademark Mylar. A coating of pressure sensitive adhesive 16 is applied to one side of the ribbon and the cable is wound in multiple layers, adhesive side down, over a spool or core 18 to form the finished package.

Because of the extreme thinness of the cable and the pressure sensitive coating on one side thereof the cable is presently wound on the same type of machinery used in winding rolls of tape. There is no provision in this type of machinery for winding the cable with the inner end exposed, as for instance, by disposing it laterally of the spool or core on which the cable is being wound. Accordingly, there is no provision in the finished package that will permit the purchaser of the wound cable to test it, say for continuity, since it is not possible to make an electrical connection with the conductors at the inner end of the roll.

In the present invention this defect is overcome by providing an annular core 18 for the roll 10 and placing one or more openings 20, 20 in the core. Care is taken to dispose the openings 20, 20 so that there is an opening in alignment with each of the conductors 12, 12 in the innermost layer of cable. It will be readily appreciated that a number of openings could be provided as is shown in FIG. 2 or a single slot or opening could be substituted, it only being necessary that the extent of the slot or single opening pass across all of the conductors in the cable whatever their number might be.

With access provided to the conductors at the inner end of the cable, a probe 22 such as that shown in FIG. 3, may be inserted through the openings 20, 20 to make contact with the conductors 12, 12. For this purpose the probe 22 has four pointed prongs 24, 24 which may be easily pushed through the top layer of insulation 14 to get at the conductors 12, 12. Each prong 24 is insulated from the others in the head of the probe 22 and has its own conductor 28, 28 that is connected through a source of electric potential and suitable metering or testing devices to the other end of the conductor in the free end 30 of the ribbon 10. In this way the continuity of the conductors in the roll of cable, as well as other properties of the cable, may be easily tested without disturbing the package.

While the invention has been explained with reference to a multiple conductor flat ribbon type of cable, it will be appreciated that, in its broader aspects, the invention is not limited to any particular type of cable nor to any particular number of conductors.

What is claimed is:

The method of testing an article of manufacture consisting of a packaged, insulated electrical cable having a plurality of flat, ribbon-like conductors disposed parallel to each other and with their flat sides in substantially the same plane as the cable, said cable being wound circumferentially in multiple layers upon the periphery of an annular core with the inner end of said cable tangent to the periphery of said core, said method comprising:

(a) forming a plurality of openings in the core from its inner surface to its periphery, corresponding in number to the number of conductors in said cable, one such opening being in registry with each conductor in the innermost layer of cable on the core, (b) inserting a plurality of probes through said openings into contact with the conductors in the cable and (c) connecting testing means in series with a source of electric energy between each of the respective conductors at the free end of the cable and said probes to complete an electrical testing circuit through the packaged cable.

References Cited by the Examiner

UNITED STATES PATENTS

| | | | |
|---|---|---|---|
| 2,476,278 | 7/49 | Boynton | 324—54 |
| 2,980,874 | 4/61 | Tarbox | 339—17 X |
| 3,048,268 | 8/62 | Rocchi et al. | 206—59 X |

OTHER REFERENCES

Publication: "Cable in Tape Form" Electronic Design, August 15, 1957, pages 48–49.

WALTER L. CARLSON, *Primary Examiner.*